United States Patent [19]

Genzling

[11] 4,103,563

[45] Aug. 1, 1978

[54] METHOD AND STRUCTURE FOR ORIENTING A BICYCLE PEDAL

[76] Inventor: Claude Genzling, 15 Avenue des Cedres, 92410 Ville D'Avray, France

[21] Appl. No.: 769,694

[22] Filed: Feb. 17, 1977

[30] Foreign Application Priority Data

Dec. 10, 1976 [FR] France .................. 76 37271

[51] Int. Cl.² .................. G05G 1/14; B60B 37/00
[52] U.S. Cl. .................. 74/594.5; 301/2.5; 74/560
[58] Field of Search .................. 74/594.4, 594.5, 594.1, 74/594.2, 594.3, 594.6, 594.7, 560, 561, 562, 562.5; 301/2.5

[56] References Cited

U.S. PATENT DOCUMENTS

| | | | |
|---|---|---|---|
| 553,638 | 1/1896 | Bailey | 74/594.5 |
| 614,856 | 11/1898 | Gerow | 74/594.5 |
| 622,543 | 4/1899 | Scherff | 74/594.5 X |
| 651,084 | 6/1900 | Oppenheim, Jr. | 74/594.5 |

Primary Examiner—Samuel Scott
Assistant Examiner—Don E. Ferrell
Attorney, Agent, or Firm—Steinberg & Blake

[57] ABSTRACT

A bicycle pedal which has an upper surface to be engaged by the sole of a shoe of a cyclist and a toe clip for extending around the toe region of the shoe is supported for free rotary movement at all times with respect to a shaft carried by a rotary crank of the bicycle. The pedal is automatically oriented at least when the rotary crank has turned through 90° beyond its top dead center position in an attitude according to which the upper surface of the pedal is substantially horizontal and directed upwardly, this latter orientation in the latter attitude being brought about by way of magnetic means which does not interfere with the free rotation of the pedal with respect to the shaft on which the pedal is supported.

14 Claims, 8 Drawing Figures

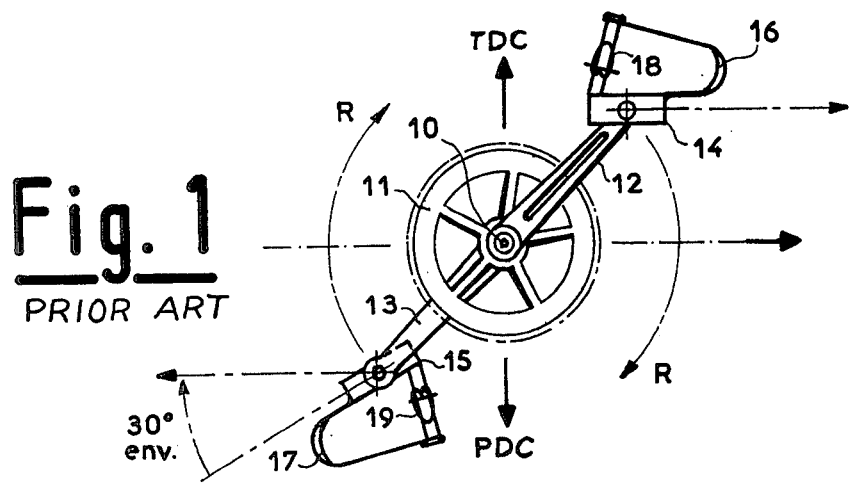

METHOD AND STRUCTURE FOR ORIENTING A BICYCLE PEDAL

BACKGROUND OF THE INVENTION

The present invention relates to bicycles.

In particular, the present invention relates to the manner in which bicycle pedals are supported.

The present invention relates in particular to the pedals of bicycles used for racing and relates in particular to arrangements to facilitate the engagement of the foot of the cyclist with the pedal.

In connection with bicycles intended to be used in sporting competitions such as racing, all parts of the bicycle are designed so as to enhance as much as possible the efficiency with which the energy of the cyclist is utilized, while also attempting to prevent as much as possible any loss of time. For example the wheels of a bicycle are made as light as possible without reducing the strength thereof, and on the other hand the bicycle wheels are provided with structures which enable the wheels to be quickly replaced in the case of puncture of a tire, for example.

The above two primary conditions of achieving maximum efficiency and minimum loss of time at the present time are not satisfied by two essential parts of a bicycle, namely the pedals thereof. Thus, since the pedals have an extremely important fundamental function in coupling the muscular system of the cyclist to the bicycle in such a way as to provide propelling of the bicycle, the arrangement of the pedals and the constructions thereof are designed so as to enhance as much as possible the efficiency of the transmission of the energy of the cyclist to the bicycle so as to propel the latter.

With this latter objective in mind, each pedal is mounted on a shaft carried by a rotary crank of the bicycle in such a way as to be freely rotatable with respect to this shaft, suitable ball bearings being utilized for this purpose, the pedal and shaft rotating one with respect to the other through a complete revolution during each revolution of the rotary crank. At the same time, during this latter operation the pedal is maintained at all times in a generally horizontal attitude by the foot of the cyclist. Thus, while the pedal is capable of transmitting to the shaft projecting from the rotary crank the force which will rotate the latter crank at the same time the pedal is perfectly free at all times to rotate with respect to the shaft on which it is mounted.

Moreover, in order to perfect the connection between the pedal and the foot of the cyclist, each pedal is provided with a toe clip generally in the form of a flexible strip extending forwardly from and forming an extension of the upper supporting surface of the pedal, this strip after extending forwardly beyond the upper pedal surface being curved upwardly and rearwardly so as to receive the toe region of the shoe of the cyclist. A free end of this flexible strip is situated over a rear portion of the pedal and is connected with a strap which extends transversely around the shoe of the cyclist while being connected to the pedal at a rear portion thereof.

The result of the above conventional construction is that the entire assembly of the pedal and toe clip has a certain unbalance which when the pedal is not engaged by the cyclist orients the pedal with the normally upper surface thereof turned downwardly while the toe clip is situated to the rear of and below the shaft which carries the pedal, the toe clip and pedal being inclined at an angle of approximately 30°–40° with respect to a horizontal plane when the operator does not have his shoe on the bicycle pedal.

It is apparent, therefore, that a considerable inconvenience is encountered by the cyclist when he attempts to place his shoe on a conventional pedal of the above type which when it is not utilized has practically a position which is inverted with respect to its normal position of operation. Thus the cyclist must first return the pedal to its proper attitude of use by way of delicate movements of the toe region of the shoe before the cyclist can properly engage his shoe with the pedal. Experience has shown that a cyclist who has his foot on the ground or floor or who has disengaged his foot from the pedal to avoid falling frequently loses a substantial amount of important time simply in reorienting the pedal so that it can properly receive his shoe. Moreover, during this interval when the cyclist must preliminarily orient the pedal properly to return it to its operating attitude, not only is the cyclist prevented from exerting any useful effort in propelling the bicycle but in addition his attention is dangerously distracted from the path travelled by the bicycle and from the behavior of the bicycle while the capability of maneuvering the bicycle is greatly limited because of its necessarily small speed of travel during such a time, so that a condition of considerable instability necessarily obtains. Thus, there is in sum as a result of the above conditions a considerable handicap to a cyclist and a substantial risk of falling.

SUMMARY OF THE INVENTION

It is accordingly a primary object of the present invention to provide a method and structure which will avoid the above drawbacks.

In particular, it is an object of the present invention to provide a method and structure which will enable a bicycle pedal or similar equipment subject to unbalance to be effectively oriented in an automatic manner so that the above drawbacks will be avoided.

Thus, it is an object of the present invention to provide a method and structure according to which a device such as a bicycle pedal can be properly oriented automatically to assume a position for convenient placing of a shoe of the cyclist on the pedal or equivalent device without any loss of time and in a completely safe manner.

Furthermore it is an object of the present invention to provide a construction and method of the above type according to which while a device such as a bicycle pedal can be automatically oriented to assume its proper operating attitude, nevertheless there is at no time any inhibiting of the transmission of power from the cyclist to the bicycle by way of the pedal thereof.

According to the invention a force automatically acts on the pedal so as to provide for the latter an attitude where the upper surface of the pedal is substantially horizontal and directed upwardly at least when a rotary crank of the bicycle has turned through an angle of 90° beyond the top dead center position of the rotary crank, this latter attitude of the pedal being achieved without any mechanical connection between the pedal and the structure carrying the same.

The above automatic orienting of the pedal in its operating attitude when the crank has turned through approximately 90° beyond its top dead center position is clearly the best possible position of the pedal to be engaged by the shoe of the cyclist with this shoe being easily received at the top surface of the pedal and in a toe clip carried thereby when the rotary crank extends substantially horizontally after having turned through approximately 90° beyond its top dead center position. The toe clip may have a construction as shown in French Pat. Nos. 2,191,411 and 2,192,525.

Thus, the above feature of automatically orienting the pedal in its operating attitude after the rotary crank has turned through approximately 90° beyond its top dead center position is selected because in this way the easiest possible access to the pedal is achieved, for example in order to fasten a strap of the toe clip, while on the other hand the position of the rotary crank at an angle of approximately 90° beyond its top dead center position situates the pedal at a location for achieving a strong starting drive for the bicycle.

The achieving of the above results of the invention without any mechanical connection between the pedal and the rotary crank which carries the pedal enables the free rotation of the pedal to be maintained without any hindrance while at the same time excluding any possible risk of preventing free rotation between the pedal and the shaft carrying the same with the possible consequence of an accident.

BRIEF DESCRIPTION OF DRAWINGS

The invention is illustrated by way of example in the accompanying drawings which form part of this application and in which:

FIG. 1 is a schematic illustration of a conventional driving structure of a bicycle with FIG. 1 showing both operating and non-operating positions of a bicycle pedal;

FIG. 2 is a fragmentary partly sectional and schematic illustration of one possible embodiment of the invention;

FIG. 3A is a fragmentary partly sectional and partly schematic illustration of another embodiment of the invention;

FIG. 3B is a partly schematic and partly sectional transverse view of the structure of FIG. 3A;

FIG. 3C is a fragmentary schematic illustration of part of the adjusting structure of FIG. 3A;

DESCRIPTION OF PREFERRED EMBODIMENTS

Figure 4:
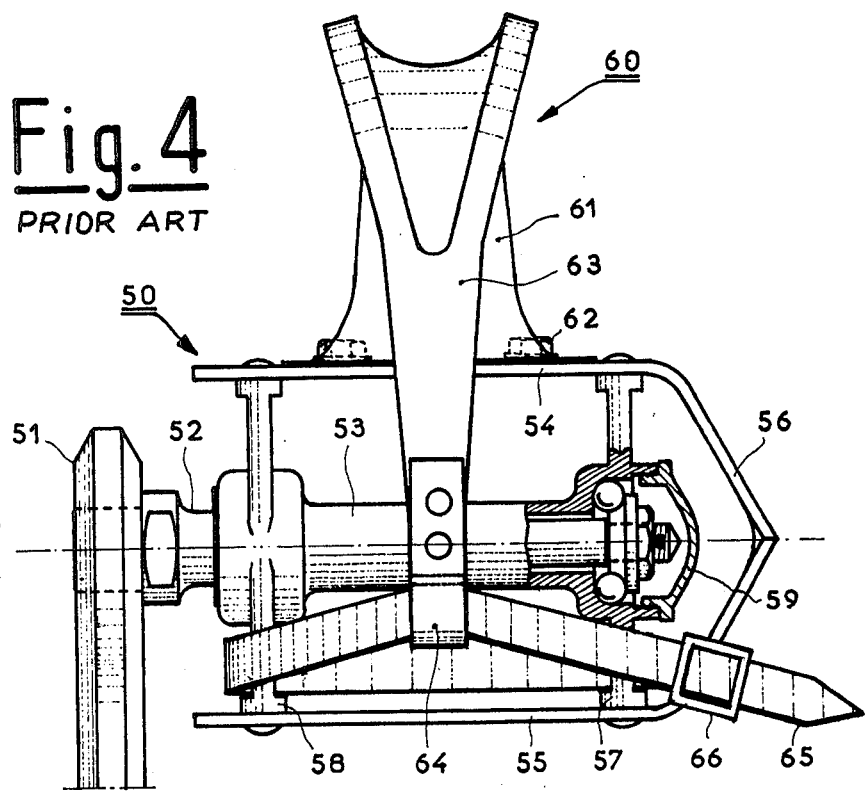
FIG. 4 is a top plan view of a pedal and toe-clip structure with FIG. 4 showing in section how the pedal is attached to a shaft which carries the pedal.

Referring now to FIG. 1, there are schematically illustrated therein the components of a pedal mechanism of a bicycle. This mechanism includes a rotary drive shaft 10 supported for rotation by a suitable bearing structure carried by the relatively short transverse tube which is conventionally situated at the lower part of the bicycle frame which is not illustrated. This drive shaft 10 fixedly carries at one end a sprocket wheel 11, which may be a single or multiple sprocket wheel assembly, the teeth of the sprocket wheel engaging a chain which transmits the drive to the rear wheel. The free ends of the shaft 10 are fixedly connected with a pair of diametrically opposed cranks 12 and 13 each of which forms a rotary crank means. Each of the cranks 12 and 13 fixedly carries at its outer free end a shaft which projects at one end from each crank, parallel to the shaft 10, and these shafts projecting horizontally from the cranks 12 and 13 respectively support for free rotary movement the pedals 14 and 15 shown in FIG. 1. Each pedal is formed by a substantially rigid metallic frame traversed by a central tubular hub which receives the shaft at the end of the crank 12 or 13, suitable ball bearings being provided to support the pedals 14 and 15 at their tubular hubs for free rotation with respect to the shafts which carry the pedals and which are fixed to the cranks 12 and 13.

Each pedal is also provided with a conventional toe clip in the form of an elastic strip 16, 17 and a flexible transverse strap 18, 19. Each strip is fixed at one end to a transverse front part of each pedal, while forming an extension of the upper supporting surface of each pedal, each of the strips 16 and 17 then being curved upwardly and rearwardly so as to be capable of enveloping the toe region of a shoe. Each of the strips 16 and 17 terminates in a loop through which the flexible strap 17, 18 passes, each strap itself being fastened across or even beneath each pedal at the region of the rear part thereof.

The above arrangement of each pedal assembly, including the pedal per se and the toe clip, has a center of gravity situated at an elevation higher than the shaft which carries each pedal when the pedal is in its normal position of use, which is to say a position where the upper surface of the pedal is substantially horizontal and directed upwardly while the toe clip is directed forwardly, as indicated for the pedal 14 and toe clip 16 of FIG. 1. The result is that each pedal assembly, when not engaged by the foot of the cyclist, will automatically assume an unbalanced position which is substantially inverted with respect to its operating position. Thus, while in FIG. 1 the pedal 14 is shown in the position of use occupied thereby when engaged by a shoe of the cyclist, the pedal 15 is shown in its position of non-use assumed thereby when a foot of the cyclist does not engage the pedal. As is indicated in FIG. 1 each pedal, such as the pedal 15, and the toe-clip structure connected thereto will automatically assume the position of non-use shown in FIG. 1 for the pedal 15 where the latter is inclined at an angle of approximately 30° with respect to a horizontal plane. Moreover, in this position of non-use the toe clip structure is directed rearwardly rather than forwardly. Thus, each pedal when not engaged by the foot of the operator will automatically assume, due to the center of gravity of the pedal and toe-clip structure connected thereto, a position inclined downwardly and rearwardly at an angle such as that illustrated for the pedal 15 in FIG. 1.

It is thus apparent that a cyclist who has stopped the travel of the bicycle and has his feet on the floor or ground, or who has disengaged a foot from the pedal for any reason, of necessity will encounter considerable difficulty in quickly placing his foot back into operative engagement with a pedal, with the toe region of the foot being surrounded by the toe clip. Such a cyclist must first return the pedal to its angular position of normal use and then while maintaining this latter unstable orientation must place his foot on the pedal, involving all of the above inconveniences and risks.

With the embodiments of the invention described below the pedal is automatically maintained in a position suitable to receive the foot of the cyclist without requiring any intervention on the part of the cyclist so that the cyclist is free of the above handicaps and risks as well as inconveniences.

Referring now to FIG. 2, there is illustrated therein a pedal means 20 supported for free rotary movement about a shaft 22 which at one end is fixed to and projects from an end of a rotary crank 21 corresponding to either of the cranks 12 and 13 of FIG. 1. The pedal means 20 includes a central transversely extending tubular hub 23 at the interior opposed ends of which are situated ball bearings supporting the pedal means for free rotary movement with respect to the shaft 22. The ends of the tubular hub 23 are centrally fixed to a pair of longitudinally extending side bars 24 and 25 the latter being connected at their front ends to a front transverse bar 26 and at their rear ends to a corresponding rear transverse bar which is not shown in FIG. 2, the section of FIG. 2 being taken just in front of the rear transverse bar.

The pedal means 20 is provided with an automatic device for holding and releasing the foot, this automatic device including a transversely extending curved toe-clip 27 supported by a pivot means 28 at the upper edge of the outer side bar 25 for turning movement with respect thereto between the upper solid line position which is the position of use and the lower dotted line position 27' which is the position of non-use when the foot is released. Thus the clip 27 will turn along the arc S between its operative and inoperative positions. An unillustrated structure such as a suitable detent structure will releasably maintain the clip 27 in its operative and inoperative positions. For example at the region of the upper edge of the outer pedal bar 25 the clip 27 is fixed with a tubular member receiving a hinge pin which is fixed at one end, for example, to the side bar 25, spaced from and extending parallel to the top edge thereof, so that this sleeve which is fixed to the clip 27 can turn about this hinge pin, and the hinge pin is provided with a spring-pressed ball capable of being received in one recess or opening in the sleeve when the clip 27 is in the solid line position and in another opening or recess in the sleeve when the clip 27 is in the position 27', so that through such a structure it is possible to releasably maintain the clip in either of the positions thereof shown in FIG. 2.

In addition, the embodiment of FIG. 2 includes a plate 29 guided for vertical sliding movement for example by the rear transverse bar of the pedal. This rear transverse bar may, for example, have at its front inner face a pair of forwardly extending ribs between which the side edges of the plate 29 are located with these ribs guiding the plate 29 by engaging its side edges for vertical movement between the solid and dotted line positions illustrated in FIG. 2. Both the curved clip member 27 and the plate 29 serve to hold and release the shoe of the cyclist. Thus in the solid line position of elements 27 and 29 the element 27 extends over the front region of the shoe while the element 29 extends up between the sole and heel of the shoe, whereas in the dotted line positions 27' and 29' of the components 27 and 29 the shoe is completely released for separation from the pedal means 20. Thus, the plate 29 is capable of moving in the direction indicated by the dot-dash line T between the upper and lower locking and unlocking positions illustrated in FIG. 2.

The important feature of the embodiment of FIG. 2 resides in the movement of the elements 27 and 29 between their locking solid line positions shown in FIG. 2 and their release, dotted line positions shown in FIG. 2. In the operative solid line positions of components 27 and 29 the entire assembly of the pedal means and components 27 and 29 provides the center of gravity G while the movement of the components 27 and 29 to their unlocking, dotted line positions 27' and 29' displaces the center of gravity of the assembly down to the location Go. This arrangement locates the center of gravity Go beneath the tubular hub 23 of the pedal means. Thus, when the components 27 and 29 are in their release positions 27' and 29', the lower center of gravity Go automatically maintains the pedal means 20 at an attitude which is at least approximately the same attitude which the pedal means has when engaged by the foot of the operator, so that there is the greatest possible convenience for the operator who is capable of engaging his foot with the pedal irrespective of the angular position of the crank 21.

Solely by way of example there is illustrated in FIG. 2 one possible structure for bringing about the movement of the components 27 and 29. Thus, the side bar 25 of the pedal fixedly carries an L-shaped member 80 which in turn fixedly carries a pair of rearwardly extending pins 82 which extend through a horizontal slot 84 formed in a plate 86 which is thus guided by the pins 82 for movement to the right and left, as viewed in FIG. 2, this plate 86 having its right end, as viewed in FIG. 2, situated in the path of downward swinging movement of the clip 27 from the solid to the dotted line position thereof, so that when the clip 27 reaches the position 27' the plate 86 is shifted to the left to the position illustrated in FIG. 2. This plate 86 is formed with an inclined slot 88 receiving a pin 90 which is fixed to and extends forwardly from the plate 29. In addition the plate 29 has its opposed lower ends connected to a pair of springs 92 which in turn are connected to the lower edges of the side bars 24 and 25.

Thus, with this arrangement when the clip 27 turns from the solid to the dotted line position 27' it will shift the plate 86 to the left, as viewed in FIG. 2, causing the slot 88 to cam the pin 90 downwardly, thus displacing the plate 29 downwardly in opposition to the force of the springs 92, and the weight of the clip 27 when in its position 27' as well as the detent structure referred to above serves to maintain the parts in their inoperative position in opposition to the force of the springs 92. When the operator places his foot on the pedal he very easily is capable of manually turning the clip 27 from the dotted line position 27' thereof to the solid line position, with the result that the springs 92 are capable of raising the plate 29 back to its solid line position while causing the slot 88 to be acted upon by the pin 90 so as to shift the plate 86 out through a relatively short distance to the right, as viewed in FIG. 2, in the position to again be engaged by the element 27 when it is swung down to the dotted line position 27'. Thus through this simple structure it is possible to bring about the required displacement of the components 27 and 29 in response to turning of the component 27 by the operator. Of course in order to release the foot the operator need only raise his foot with respect to the pedal so as to turn the element 27 with his foot from the position 27 shown in solid lines to the dotted line position 27'.

It is to be noted that with the embodiment of the invention shown in FIG. 2 the important point is not any increase in the weight of the pedal, the weight-increase being very slight and of no consequence, but rather the importance of this embodiment resides in the fact that the elements added to the conventional pedal structure are highly justified for reasons other than the weight thereof, providing the pedal with additional capabilities beyond that of a conventional pedal. It is again emphasized that the embodiment of FIG. 2 is only an illustration of the principle of the invention and not necessarily of details which are of any particular importance. Thus, other structures which are the equivalent of that of FIG. 2 may be provided in accordance with the invention to achieve similar results.

Referring now to FIGS. 3A–3C, there is schematically illustrated therein a pedal means 30 supported for free rotation on a shaft 32 which is fixed at one end to the outer free end of the fragmentarily illustrated crank 31. The pedal means 30 has a central tubular hub 33 supported for free rotation with respect to the shaft 32. This pedal means 30 includes a pair of longitudinally extending side bars 34 and 35, respectively fixed to the inner and outer ends of the hub 33, as well as front and rear transversely extending bars 36 and 37 interconnected at their outer free ends by a curved outer guard 35'. The front face of the front transverse bar 36 is fixedly connected with a conventional toe-clip 38 while in this embodiment the inner side bar 34 is prolonged at its rear so as to have a tab portion 39.

A permanent magnet 40 is fixed to the outer side face of the crank 31 as by being embedded therein or glued thereto, or through any other suitable fixing means, this crank 31 customarily being made of stainless steel or a light alloy which is non-magnetic. The permanent magnet 40 is situated at a distance $r$ from the axis of the shaft 32, this distance $r$ corresponding to the radial distance of the tab 39 from the axis of the shaft 32. The distance $r$ forms the radius of a circle which a center point of the tab 39 would circumscribe around the axis of the shaft 32. The tab 39 fixedly carries a second permanent magnet 41 positioned so as to move past and in front of the first magnet 40, while defining a relatively narrow gap therewith, during each revolution of the crank 31. The magnets 40 and 41 respectively have opposite poles directed toward each other so that they attract each other when they are situated in alignment with each other. As is apparent from FIG. 3B, the magnet 41 can advantageously be situated at a central region of the tab 39 between a pair of additional permanent magnets 42 and 43 the polarities of which are reversed with respect to the polarity of the magnet 41 so that while the magnet 41 is attracted by the magnet 40 the magnets 42 and 43 are simultaneously repelled thereby. It is also possible to provide a construction according to which the tab 39 does not carry any permanent magnets but instead is itself made of a magnetic material such as soft iron, in such a way that it will be attracted by the permanent magnet 40 simply as a result of having a lesser reluctance.

In any event, the magnet 40 operates to immobilize the pedal 39 in a position where the side bars 34 and 35 of the pedal 30 extend parallel to the crank 31 with the front bar 36 of the pedal situated beyond the free end of the crank 31 as illustrated in FIG. 3A. Thus, as soon as the pedal means 30 reaches a position in the region of the position where the magnets 40 and 41 are in alignment with other, these magnets will attract to releasebly hold the pedal 39 in the position where the magnets 40 and 41 are aligned with each other. As is apparent from FIG. 1, when a pedal is not engaged by the foot of the operator it will of necessity pass through this position with respect to the crank during each revolution thereof. Thus, when the operator removes his foot from the pedal the pedal will assume, as a result of the center of gravity of the pedal and toe-clip assembly the attitude shown for the pedal 15 in FIG. 1, and thus when the crank has turned through approximately 90° beyond the bottom dead center position of the crank the magnets 40 and 41 will be aligned so that after turning beyond a position extending rearwardly and horizontally from the drive shaft 10 the crank and pedal will remain aligned in the position shown in FIG. 3A, being held in this position by the force of the magnetic means 40, 41. This particular angular immobilization of the pedal means and crank with respect to each other brought about by way of the magnet 40 will thus situate the pedal in its normal attitude of use which is to say in an attitude where its upper surface is horizontal and directed upwardly when the crank extends horizontally and forwardly from the shaft 10 after the crank has turned through 90° beyond its top dead center position, so that with the construction of FIGS. 3A and 3B the pedal means will automatically assume a proper operating position when the crank extends forwardly from the shaft 10 once the crank has turned through a sufficient part of a revolution R shown in FIG. 1 to enable the crank and pedal means to become aligned as described above. It is to be noted that this particular operative position of the pedal is the best possible position for developing a powerful starting drive for the bicycle when the operator pushes downwardly on the pedal with the latter situated at the front end of a forwardly and substantially horizontally extending crank. It is moreover to be noted that the above advantages are achieved without any substantial change in the construction of the pedal and at the cost of a minimum increase in weight, taking into account the forces which can be achieved from relatively small permanent magnets which are freely available at the present time, particularly those which are made of cobalt and rare earth, such as, for example, magnets made of Samarium. Moreover, it is to be noted that this construction will not be undesirably influenced in any way by various environmental factors, and in particular is not influenced by temperature changes or staining, or the like.

The efficiency with which the structure operates, as a corollary to the weight added thereby, depends primarily on the magnitude of the gap between the permanent magnet 40 carried by the crank and the tab 39 or the one or more magnets carried thereby. For obvious mechanical reasons, the magnitude of this gap must be compatible with the possible play between these components in order to avoid any risk of mechanically blocking the free rotary movement of the pedal even after a long period of use. Moreover, the length of the tab 39 and thus of the moment arm $r$ thereof with respect to the axis of the shaft 32 is necessarily limited. In other words when the magnet 41 is attracted by the magnet 40 the magnet 41 acts through the moment arm $r$ to turn the pedal 30 to its position of alignment with the crank 31 as described above. Moreover, it is best if the structure does not interfere in any way with the normal operation of the pedal and in particular does not undesirably influence the efficiency of the operation of the foot of the cyclist on the pedal by providing any unreasonable braking or resistance to turning of the crank.

For these reasons it can be advantageous to adjust the size of the gap between the magnets 40 and 41 depending upon whether the pedal is or is not engaged by the foot of the cyclist. Thus, it may be desirable to add to the above components a means 44 (designated by an arrow in FIG. 3B) which, in response to the pressure of the foot of the cyclist, will bring about a retraction of the magnet 41 with respect to the magnet 40 as well as a retraction of the magnets 42 and 43 if they are utilized, so as to increase in this way the gap between the magnets during normal use of the pedal when it is engaged by the foot of the operator. In this way it is possible to prevent any risk of mechanically blocking the free rotary movement of the pedal while at the same time enabling the gap to be reduced, when the pedal is not engaged by the foot of the cyclist, by providing for the magnet or magnets carried by the tab 39 a limited translation in the horizontal direction t indicated in FIG. 3A.

As is shown in FIGS. 3A and 3C, it is possible easily to achieve this result by connecting the magnet 41, and also the magnets 42 and 43 if they are utilized, to an L-shaped member 94 which is acted upon by a spring 96 compressed between the member 94 a member 98 fixed to and projecting rearwardly from the rear bar 37 of the pedal. The magnet 41 is guided for movement in a slot of the tab 39 and carries a projection 100 which limits the movement of the magnet 41 to the left, as viewed in FIG. 3A. The bar 37 fixedly carries a pivot pin 102 on which a lever 104 is mounted for turning movement, this lever 104 having an upper edge projecting upwardly beyond the upper edge of the bar 37. Thus, when the operator places his shoe in engagement with the top surface of the pedal, this shoe will engage the upper end of the lever 104 and turn the latter in a counterclockwise direction about the pivot 102, as viewed in FIG. 3C, thus causing the lever 104 to displace the member 94 and thus the magnet 41 to the right, as viewed in FIG. 3A, so as to increase the gap between the magnets 40 and 41 as long as the operator has his foot on the pedal. As soon as the operator removes his foot from the pedal the spring 96 expands to return the magnet 41 to its position providing the minimum gap between the magnets 40 and 41 as illustrated in FIG. 3A. Of course, the magnets 42 and 43, if used, can be connected by suitable non-magnetic elements, for example, to the magnet 41 for movement therewith.

Figures 5, 6:
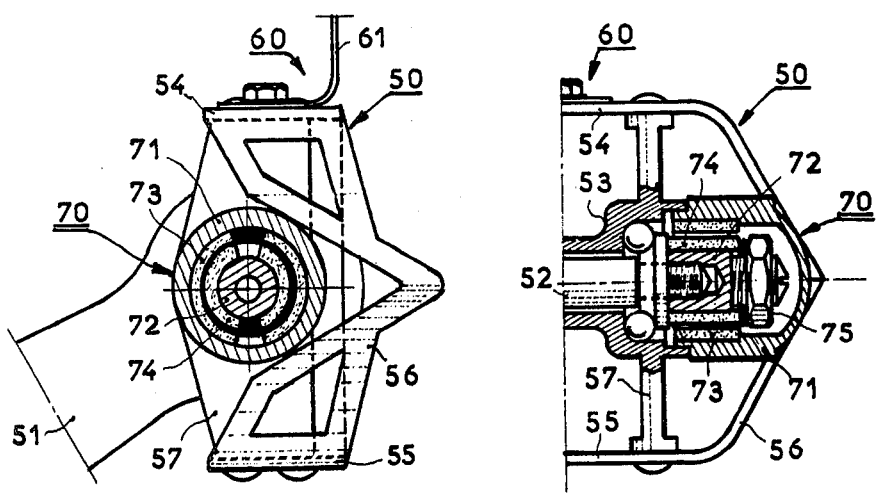
FIG. 5 is a transverse partly sectional illustration of a further embodiment of the invention adapted to be used as a slight modification of the structure of FIG. 4.
FIG. 6 is a fragmentary sectional axial illustration of the structure of FIG. 5.

FIG. 4 shows a pedal means 50 capable of having conventional parts thereof replaced by suitable components, in accordance with the present invention, so as to achieve the desired results, the parts which replace those of FIG. 4 being shown in FIGS. 5 and 6.

The pedal means 50 is schematically illustrated in FIG. 4 in a top plan view, which is to say looking at the upper surface of the pedal which is engaged by the shoe of the cyclist and which is maintained substantially horizontal during driving of the bicycle by the cyclist. The pedal 50 is carried by a shaft 52 which is fixed to and projects from the outer end of the crank 51 shown in FIG. 4. The pedal means 50 includes the central transverse tubular hub 53 which receives the shaft 52 and which houses at its opposed ends ball bearings which serve to support the pedal means 50 for free rotation with respect to the shaft 52. The ball bearings include suitable races which hold the balls of the ball bearing in proper position as is apparent from the sectional part of the illustration in FIG. 4. The pedal includes the front and rear transversely extending bar portions 54 and 55 as well as the side, longitudinally extending bar portions 57 and 58, the parallel front and rear bar portions 54 and 55 forming part of a metal stamping having an intermediate portion 56 suitably curved so as to form an outer guard, this metal stamping being riveted, for example, to the free ends of the side bars 57 and 58 which are integral with and project from the opposed end portions of the tubular hub 53. The tubular hub 53 is closed at its outer end by a hollow cap or button 59 which prevents dust or other foreign matter from entering into the interior of the hub 53.

The pedal 50 is connected with a toe-clip 60 which includes a flexible metallic strip 61 one end of which is suitably curved and fixed by screws 62 to the front transverse bar 54 of the pedal 50. Thus, the forwardly extending lower portion of the strip 61 forms an extension of the shoe-supporting surface of the pedal, while an elongated free end portion 63 of the strip 61, which has a cutout stamped therethrough, is curved rearwardly so as to be situated above the pedal, this elongated portion 63 terminating in a loop 64. A flexible strap 65 extends, for example, through suitable slots formed in rear portions of the side bars 57 and 58 and through the loop 64 while also passing through a suitable opening formed in the guard 56, this strap having an adjustable fastening buckle 66 enabling the strap 65 to be adjusted for maintaining the shoe reliably on the pedal.

The combination of the pedal structure 50 and toeclip 60 as described above and shown in FIG. 4 will, due to the unbalance thereof, tend to assume the position shown for the pedal 15 in FIG. 1. However, as described below, by replacing parts of the structure of FIG. 4 with components shown in FIGS. 5 and 6 and described below it is possible to maintain the pedal automatically oriented in a proper attitude to receive the foot of the operator.

The latter result is achieved by way of the structure 70 of the invention which is illustrated in FIGS. 5 and 6. In FIGS. 5 and 6 the strap 65 is omitted for the sake of clarity, and for the same reason the strip 61 is only fragmentarily illustrated. The structure 70 includes a hollow closure cap 71 carried by the outer free end of the tubular hub 53 and replacing the conventional cap 59. Also, the nut which is threaded onto the outer end of the shaft 52 in FIG. 4, in order to retain the outer race of the right ball bearing of FIG. 4 in position, is replaced by a fitting 72 formed with an interior thread and threaded onto the shaft 52 so as to function also to retain the outer race of the outer bearing in position as illustrated most clearly in FIG. 6.

The threaded member or fitting 72 thus forms part of the shaft 52 and is coaxially surrounded by a cylindrical portion of the cap 71 which forms part of the tubular hub 53 of the pedal. Thus, the cylindrical part of the cap 71 and the fitting 72 are coaxial.

A ring 73 of a hard magnetic material is suitably fixed to the inner surface of the cylindrical portion of cap 71 as by being glued to the latter, for example, this ring 73 being made, for example, of ferrite and defining a relatively narrow cylindrical gap with a similar ring 74 which is mounted with a relatively small amount of friction on the exterior surface of the fitting 72. The angular position of the ring 74 with respect to the fitting 72 is capable of being adjusted by way of a nut 75 threaded onto an outer thread of fitting 72 and engaging a free end of the ring 74 which is distant from the race of the ball bearing shown in FIG. 6. Thus, by way of the nut 75 it is possible to adjust the angular position of the ring 74 with respect to the axis of the shaft 52. It will be noted that the outer end of the fitting 72 is formed with a slot to receive a screwdriver. Thus with the nut 75 loosened it is possible by way of a screwdriver, after the cap 71 has been removed, to thread the fitting 72 onto the outer threaded end of the shaft 52 so as to adjust the pressure with which the bearing race is held in position. Then the ring 74 can be turned to a selected angular position and the nut 75 can be tightened to hold the ring 74 in its adjusted angular position. It is thus possible to adjust the angular position of the ring 74 with respect to the axis of the shaft 52 and thus with respect to the crank 51. The possibility of independently turning the fitting 72 with a screwdriver enables the fixing of the bearing race to be brought about independently of the angular adjustment of the ring 74. The position of the outer ring 73 of the magnet means 73, 74 is determined simply by threading the cap 71 all the way into the interior threads found at the outer end of the hub 53. Thus it will be seen from FIG. 6 that the hub 53 terminates at its right end in an end surface which engages a shoulder of the closure member 71 so as to determine the position of the ring 73.

In accordance with the invention the rings 73 and 74 are magnetized at least locally in such a manner as to provide at their surfaces which face each other opposed magnetic poles angularly distributed in such a way as to be complementary but not uniform. The distribution of the poles is selected so that only at a single angular position of the rings with respect to each other will the magnetic poles interact so as to attract each other and develop the magnetic force which is capable of preventing rotation of the pedal around the shaft 52 when the pedal is not engaged by the foot of the cyclist, so as to maintain the pedal when not engaged by the foot of the operator at a particular angular position with respect to the crank 51 which remains unchanged and uninfluenced by the lack of balance of the pedal and toe-clip assembly. For example, and in the simplest case, one of the rings can be provided with a single north pole and the other of the rings with a single south pole similarly situated so that with these poles respectively situated at the surfaces of the rings 73 and 74 which confront each other, there will be an angular attraction which will maintain the pedal in a preselected angular position with respect to the crank 51 when the pedal is not engaged by the cyclist. However, in the particular example illustrated each ring has north and south poles which are diametrically opposed, or more simply each ring is magnetized in a diametral plane thus providing the most convenient distribution for rendering the tubular ferrite components operative for the purposes of the invention. Other possible magnetic distributions may, however, be utilized such as, for example, discrete poles each situated between a pair of opposed poles. Moreover, suitable poles can be provided by way of magnetic plugs or bars which are suitably fitted at and fastened in any suitable way to the surfaces of the rings 73 and 74 which confront each other, these rings in this case being made of a non-magnetic material.

Of course, with this embodiment the orientation of the poles of the rings 73 and 74 is such that when the crank 51 is in a horizontal position extending forwardly from its axis of rotation the magnetic attraction between the rings 73 and 74 is at a maximum, thus maintaining the pedal oriented in a position where the upper surface of the pedal is horizontal and directed upwardly with the toe-clip extending over the pedal, so that the pedal is automatically maintained freely accessible to the foot of the cyclist when the crank 51 extends forwardly in a horizontal position from its turning axis.

Thus, three different possible embodiments of the invention have been described above and are illustrated in the drawings, all embodiments having in common the fact that a force acts on the pedal to maintain it automatically in a proper attitude to receive the foot of the cyclist without any inconvenience or loss of time, this force being provided by way of weight-distribution with the embodiment of FIG. 2 and by way of a magnetic means with the remaining embodiments, in such a way that even though this force is applied nevertheless the pedal is at all times in a condition free to rotate in a completely unhindered manner with respect to the shaft which supports the pedal.

In the embodiment of FIG. 2, when the foot of the operator does not engage the pedal, the latter is provided with a center of gravity situated below and somewhat to the right of the shaft which supports the pedal in its normal operative position. In this particular embodiment the pedal when not engaged by the foot of the cyclist automatically takes and maintains at all times its horizontal attitude of normal use. Thus this particular embodiment has a considerable advantage in that it permits the operator to engage the pedal and place the toe region of the shoe within the toe-clip or an equivalent device at any point along the turning circle of the pedal, thus avoiding any possibility of catching the floor or ground and risking a fall. This particular embodiment of course necessitates some additional weight for the pedal, but this latter factor can be accepted because the advantages justify the relatively small added weight.

With respect to the second embodiment shown in FIGS. 3A–3C, the proper operating position for the pedal is automatically maintained by way of magnets situated in such a way that they cannot engage each other during operation of the pedal, the pedal being maintained aligned with the crank upon turning of the crank beyond its top and bottom dead center positions. Thus, this embodiment provides the advantage that irrespective of the particular static equilibrium of the pedal it will necessarily be aligned with the crank, as soon as the latter turns through a given angle beyond a location such as its bottom dead center position, with the most convenient arrangement being provided as illustrated in such a way as to have the pedal assume its proper attitude for conveniently receiving the foot of the cyclist after the crank has turned through 90° beyond its top dead center position. By properly selecting the magnetic forces and the locations of the magnets, this particular embodiment assures the desired results without any apprciable increase in the weight of the pedal and/or the crank and without any appreciable modification in the structure thereof. Moreover, because only a relatively weak magnetic field is utilized, the effect thereof becomes noticeable only when the gap between the magnets is at a minimum, and thus only during an extremely small part of the angle of turning of the crank during operation of the bicycle, and even in this case only when the crank rotates at a relatively small angular speed. In other words, this embodiment does not in any way interfere with the normal operation of the bicycle, particularly inasmuch as in principle any braking, which in fact is not sensed, is necessarily the result of an equal acceleration.

According to this second embodiment of the invention, the confronting sides of the crank and pedal respectively carry the permanent magnets which are of opposite polarity although one of these magnets can be situated between two additional magnets as set forth above. This second embodiment has the relatively minor inconvenience of requiring the magnets to be situated at the outer surface regions which are situated at the sides of the crank and pedal so that the magnets are not protected from shocks and effects of weather, and at the same time the position in which the pedal is immobilized is necessarily fixed without possibility of adjustment, in alignment with the crank.

In order to eliminate these latter relatively minor inconveniences, the third embodiment of the invention is provided, this embodiment including the coaxial elements which are respectively fixed with the pedal and the shaft supporting the same, and these coaxial elements of course are spaced from each other sufficiently so that there is reliably maintained between the elements a gap adequate to prevent their mechanical engagement with each other at any time. At least one of these elements is or includes a permanent magnet capable of achieving a magnetic field which is circumferentially distributed in a non-uniform manner and which is angularly positioned so that it is possible to immobilize the pedal when it is not engaged by the foot of the cyclist in a predetermined angular position with respect to the shaft which supports the pedal and thus with respect to the crank.

In practice, this particular angular orientation of the magnetic field is selected in such a way that the pedal is in its proper attitude for operation with its upper surface directed upwardly and with the toe clip directed forwardly after the crank has turned beyond its top dead center position by an angle of 90°. It is to be noted that before the pedal is magnetically immobilized in the latter position it will due to its own unbalance automatically assume a position which is inverted with respect to its normal position of operation, the pedal being magnetically immobilized with respect to the crank when the latter turns beyond its bottom dead center position, so that the pedal will have its proper operating position when the crank extends horizontally forwardly from its turning axis. The structure will thus operate to achieve this latter condition if the magnetic immobilizing force is sufficient to overcome the unbalance of the pedal in one direction or the other, since the weight of the pedal acts alternately in opposite directions on the pedal which is immobilized magnetically with respect to the crank. It is furthermore to be noted that when the cyclist has his foot in engagement with the pedal, the immobilizing force is present only when the pedal passes through a relatively small angular distance which is situated at the part of the circle along which the pedal travels where the cyclist provides the greatest force on the pedal. Thus with this embodiment there is absolutely no appreciable restraint on the normal operation of the bicycle.

Moreover, with this third embodiment of the invention, since one of the magnetic rings is carried by a closure member substituted for the conventional closure cap which closes the outer end of the hub of the pedal while the other forms part of a fitting threaded onto the shaft which supports the pedal, substituted for the conventional nut which holds the bearing race in position, there is actually hardly any modification in the construction of the pedal itself.

In order to achieve with this embodiment a perfectly stable immobilization of the pedal even though it is subjected to certain shocks and inertia effects, relatively complex configurations can be utilized to bring about the required immobilization when the pedal and shaft which carries the same turn one with respect to the other at a given angular location. Thus, for example, each pole of one of the magnetic rings can be situated between a pair of opposed poles. Also, it is possible to provide a construction where only one of the rings is magnetic while the other is made of a soft magnetic material enabling the required magnetic force to be created as a result of lesser reluctance, for example as a result of the fact that the gap between the magnetic components can increase very rapidly.

Moreover, the two magnetic components of the embodiment of FIGS. 5 and 6 while being coaxial can also be situated in such a way that one of the components is situated axially beyond the other so as to provide between the components a radial rather than a cylindrical gap. Moreover, the rings 73 and 74 can be replaced by discs or bars respectively carried by the free end of the shaft 52 and the hollow closure member 71.

Thus, it is apparent that the invention is not necessarily restricted to the details set forth above only by way of example but instead can be practiced with equivalent structures covered by the claims which follow.

What is claimed is:

1. In a method for controlling the attitude of a bicycle pedal which has an upper surface to be engaged by the sole of the shoe of a cyclist during operation of a bicycle and which also has a toe clip for extending around the toe region of the shoe of a cyclist which engages the upper surface of a pedal, the steps of maintaining the pedal at all times free to turn with respect to a shaft which supports the pedal and which is connected to a rotary crank of the bicycle, and simultaneously acting on said pedal with a magnetic force which automatically orients said pedal when it is not engaged by the shoe of a cyclist in an attitude where said upper surface of the pedal is directed upwardly and is substantially horizontal at least when the rotary crank has turned through an angle of approximately 90° beyond a top dead center position of the crank.

2. In a bicycle, rotary crank means having a turning axis about which said crank means rotates during operation of a bicycle, said rotary crank means having a free end region distant from said axis and carrying at said free end region a shaft extending from said crank means in a direction parallel to said axis, pedal means supported by said shaft for free rotation at all times with respect thereto and having an upper surface adapted to be engaged by a sole of a shoe of a cyclist during operating of the bicycle, said pedal means carrying a toe-clip means which extends around the toe region of a shoe which engages the upper surface of said pedal means during operation of the bicycle, and magnetic orienting means operatively connected with said pedal means for automatically orienting the latter magnetically when it is not engaged by a shoe of a cyclist in an attitude where the upper surface of the pedal means is directed upwardly and substantially horizontal at least when said rotary crank means has turned through an angle of approximately 90° beyond a top dead center position of said rotary crank means, and said orienting means acting on said pedal means without inhibiting the freedom of said pedal means to turn with respect to said shaft.

3. The combination of claim 2 and wherein said rotary crank means and shaft form one unit and said pedal means forms another unit, and said units turning one with respect to the other during operation of said one unit when the cyclist acts on said other unit, said units respectively having surface areas which are adjacent but spaced at least slightly from each other and which turn relative to each other at least when said crank means has turned through 90° beyond its top dead center position, and said orienting means including a means having at least a pair of parts respectively carried by said surface areas and being spaced at all times from each other while providing between themselves a gap which has a predetermined minimum magnitude at least when said rotary crank means has turned through 90° beyond its top dead center position.

4. The combination of claim 3 and wherein one of said parts of said magnet means includes at least one permanent magnet while the other of said parts of said magnet means is made of a magnetic material.

5. The combination of claim 3 and wherein said parts of said magnet means respectively include at least a pair of permanent magnets which have respectively different poles attracted toward each other when said parts provide said minimum gap.

6. The combination of claim 5 wherein said magnet means includes at each side of one of said permanent magnets a pair of additional magnets of a polarity opposite to said one permanent magnet to be repelled by the permanent magnet of the other of said parts.

7. The combination of claim 3 and wherein one of said surface areas is formed by a part of said rotary crank means while said pedal means includes a tab situated at a part of said pedal means which is most distant from said shaft, said tab forming the other of said surface areas.

8. The combination of claim 7 and wherein a means is carried by said pedal means to be engaged by a shoe of a cyclist and to act automatically on the part of said magnet means which is carried by said pedal means for increasing the gap between said parts of said pedal means when the shoe of a cyclist engages said pedal means.

9. The combination of claim 3 and wherein said shaft means and pedal means respectively include inner and outer coaxial portions with said outer portion of said pedal means coaxially surrounding and being at all times spaced from said inner portion of said shaft means, and said inner and outer portions respectively forming said surface areas.

10. The combination of claim 9 and wherein said magnet means includes a pair of rings respectively carried by said inner and outer portions and defining between themselves a cylindrical gap.

11. The combination of claim 10 and wherein said pedal means includes a closure cap having a hollow interior part of which forms said outer portion of said pedal means.

12. The combination of claim 11 and wherein said shaft means includes a threaded member within said closure cap carried by said shaft means for fixing a bearing means which supports said pedal means for rotation with respect to said shaft means, and said threaded member forming said inner portion constituting one of said surface areas.

13. The combination of claim 12 and including a means for releasably fixing the part of said magnet means which is carried by said inner portion at a predetermined angular position with respect to said inner portion.

14. The combination of claim 12 and wherein said rings are made of a magnetic material and are asymetrically polarized.

* * * * *